(12) United States Patent
Chen et al.

(10) Patent No.: US 10,791,112 B2
(45) Date of Patent: Sep. 29, 2020

(54) MESSAGE RIGHT MANAGEMENT METHOD, DEVICE AND STORAGE MEDIUM

(71) Applicant: Tencent Technology (Shenzhen) Company Limited, Shenzhen, Guangdong (CN)

(72) Inventors: Yao Guang Chen, Guangdong (CN); Bo Dong Liu, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/982,481

(22) Filed: May 17, 2018

(65) Prior Publication Data

US 2018/0270217 A1 Sep. 20, 2018

Related U.S. Application Data

(63) Continuation of application No. PCT/CN2017/085570, filed on May 23, 2017.

(30) Foreign Application Priority Data

May 27, 2016 (CN) .......................... 2016 1 0364005

(51) Int. Cl.
*H04L 29/06* (2006.01)
*H04L 12/58* (2006.01)
(Continued)

(52) U.S. Cl.
CPC ............ *H04L 63/083* (2013.01); *G06F 21/31* (2013.01); *G06F 21/41* (2013.01);
(Continued)

(58) Field of Classification Search
None
See application file for complete search history.

(56) References Cited

U.S. PATENT DOCUMENTS

| 8,843,997 | B1 * | 9/2014 | Hare | .................. | H04L 63/0281 |
| | | | | | 709/200 |
| 10,417,613 | B1 * | 9/2019 | Brisebois | ........... | G06Q 10/1095 |

(Continued)

FOREIGN PATENT DOCUMENTS

| CN | 1832393 A | 9/2006 |
| CN | 103491080 A | 1/2014 |

(Continued)

OTHER PUBLICATIONS

Office Action dated Apr. 12, 2019 for Korean Application No. 10-2018-7016023, 9 pages.

(Continued)

*Primary Examiner* — Farid Homayounmehr
*Assistant Examiner* — Olanrewaju J. Bucknor
(74) *Attorney, Agent, or Firm* — Brinks Gilson & Lione

(57) ABSTRACT

A message right management method, and a device and storage medium for implementing the method, are provided. The message right management method includes obtaining a message created by a source user, and sending a message notification to a target user in a social platform. The method further includes verifying the target user when receiving a request for logging onto a message page from the target user, and controlling logon of the target user to the message page on the basis of a verification result. The method further includes, when receiving a service request of the target user with respect to the message, determining, based on a message right control policy, whether the target user has a right (Continued)

corresponding to a service requested by the service request, and controlling a response to the service request according to a determining result.

18 Claims, 13 Drawing Sheets

(51) Int. Cl.
    *G06F 21/31*     (2013.01)
    *G06F 21/62*     (2013.01)
    *G06F 21/41*     (2013.01)
    *H04W 4/12*     (2009.01)

(52) U.S. Cl.
    CPC .......... *G06F 21/6218* (2013.01); *H04L 51/14* (2013.01); *H04L 51/32* (2013.01); *H04L 63/0892* (2013.01); *H04L 63/10* (2013.01); *H04W 4/12* (2013.01)

(56) References Cited

U.S. PATENT DOCUMENTS

| | | | |
|---|---|---|---|
| 2005/0021785 A1 | 1/2005 | Nakaji | |
| 2008/0070593 A1* | 3/2008 | Altman | H04W 4/029 455/457 |
| 2009/0254561 A1* | 10/2009 | Shao | H04L 67/306 |
| 2012/0158589 A1* | 6/2012 | Katzin | G06Q 20/22 705/44 |
| 2014/0074629 A1* | 3/2014 | Rathod | G06Q 30/0277 705/14.73 |
| 2014/0297770 A1* | 10/2014 | Wada | H04L 51/02 709/206 |
| 2015/0019654 A1* | 1/2015 | Wheeler | H04L 51/24 709/206 |
| 2016/0105463 A1* | 4/2016 | Stuntebeck | H04L 63/06 726/1 |
| 2016/0306996 A1* | 10/2016 | Kulkarni | G06Q 10/10 |
| 2017/0041304 A1* | 2/2017 | Tal | G06Q 50/01 |

FOREIGN PATENT DOCUMENTS

| | | |
|---|---|---|
| CN | 103824013 A | 5/2014 |
| CN | 104410680 A | 3/2015 |
| CN | 104618217 A | 5/2015 |
| CN | 105099686 A | 11/2015 |
| CN | 105530175 A | 4/2016 |
| CN | 106096343 A | 11/2016 |
| JP | 2016-006554 A | 1/2016 |
| KR | 10-2015-0039943 A | 4/2015 |
| WO | WO-2014026961 A1 * | 2/2014 ............. H04L 51/32 |

OTHER PUBLICATIONS

International Search Report of PCT/CN2017/085570 dated Aug. 9, 2017 (14 pages).

Office Action dated Jun. 4, 2018 for Chinese Application No. 201610364005.1, (8 pages).

\* cited by examiner

| All | Sent | Received |

[Message] How about this

👤 jingle 04-28 11:20

Trance, wild fish

📎 2 picture attachments (40 scores)

Read by: 3 persons

[Message] Lalala picture

👤 jingle 04-28 10:55

This (10 scores)

Read by: 0 person

[Message] Trance Teste (23 scores)

✉ Message      ➕      👤 Me

FIG. 3c

MESSAGE RIGHT MANAGEMENT METHOD, DEVICE AND STORAGE MEDIUM

CROSS REFERENCE OF RELATED APPLICATION

This application is a continuation of International Patent Application No. PCT/CN2017/085570, filed on May 23, 2017, which claims priority to Chinese Patent Application No. 201610364005.1, filed on May 27, 2016 with the State Intellectual Property Organization (SIPO), the entirety of all of which are incorporated by reference herein.

FIELD OF THE TECHNOLOGY

This application relates to the communications technologies, and in particular, to a message right management method, device and storage medium.

BACKGROUND OF THE DISCLOSURE

With the development of the mobile Internet, mobile terminals (such as mobile phones, tablet computers, and note computers) are widely used. A user installs a client for sending and receiving messages, and sends messages to a user or a group by using the client.

For example, messages are exchanged with a user in a social platform in various manners (such as cellular communications, and wireless local area network communications) by using a social application. Particularly, a message may be sent to a group (such as a multi-user session, and WeChat Moments). The message carries a text and voice to realize communication between users. In addition, the message can further realize a sharing function in the group. For example, the message may carry a shared video, a picture, and other media information. For another example, the message may include a shared webpage, or other types of information.

In a scenario of sending a message to a group, the related technology provides a solution of sending the message to users in the group. Once the message is sent, a user sending the message cannot control rights possessed by the users receiving the message with respect to the received message.

SUMMARY

According to at least some of the disclosed embodiments, a message right management method, device and storage medium, are disclosed for controlling rights possessed by users in a social platform with respect to a received message.

Technical solutions of the embodiments are implemented at least as follows:

According to a first embodiment, a message right management method includes obtaining a message created by a source user, and sending a message notification to a target user in a social platform, verifying the target user when receiving a request for logging onto a message page from the target user, controlling logon of the target user to the message page on the basis of a verification result, when receiving a service request of the target user with respect to the message, determining, based on a message right control policy, whether the target user has a right corresponding to a service requested by the service request, and controlling a response to the service request according to a determining result.

According to a second embodiment, a message right management method includes receiving, from a social platform, a message notification corresponding to a message created by a source user, when receiving a logon instruction of a target user, initiating a request for logging onto a message page to a server, where the request for logging onto the message page is used for triggering the server to verify the target user, and control, based on a verification result, logon of the target user to the message page, and when receiving a service request instruction of the target user, initiating a service request for the message on the message page to which the target user logs on, where the service request is used for triggering the server to determine, based on a message right control policy, whether the target user has a right corresponding to a service requested by the service request, and control a response to the service request according to a determining result.

According to a third embodiment, a server includes an obtaining module configured to obtain a message created by a source user, and send a message notification to a target user in a social platform, a verification module, configured to verify the target user when receiving a request for logging onto a message page from the target user, and control logon of the target user to the message page on the basis of a verification result, and a control module, configured to: when receiving a service request of the target user with respect to the message, determine, based on a message right control policy, whether the target user has a right corresponding to a service requested by the service request; and control a response to the service request according to a determining result.

According to a fourth embodiment a terminal includes, a receiving module, a logon module, and a service request module, where the receiving module is configured to receive, from a social platform, a message notification corresponding to a message created by a source user, the logon module is configured to: when receiving a logon instruction of a target user, initiate a request for logging onto a message page to a server. Where the request for logging onto the message page is used for triggering the server to verify the target user, and control, based on a verification result, logon of the target user to the message page, and the service request module is configured to: when receiving a service request instruction of the target user, initiate a service request for the message on the message page to which the target user logs on. Where the service request is used for triggering the server to determine, based on a message right control policy, whether the target user has a right corresponding to a service requested by the service request, and control a response to the service request according to a determining result.

According to a fifth embodiment, a server includes a memory, configured to store an executable program, and a processor configured to implement the message right management method according to the first embodiment when executing the executable program stored in the memory.

According to a sixth embodiment, a terminal includes a memory configured to store an executable program, and a processor, configured to implement the message right management method according to the second embodiment when executing the executable program stored in the memory.

According to a seventh embodiment, a storage medium stores an executable program, where the executable program, when executed by a processor, implements the message right management method according to the first embodiment disclosed herein.

According to an eighth embodiment, a storage medium stores an executable program, where the executable program, when executed by a processor, implements the message right management method according to the second embodiment disclosed herein.

A module described herein may include software, hardware, and/or circuitry for implementing the corresponding features.

At least the following technical improvements are provided by the implementation of the features disclosed herein:

1) A message created by a source user reaches a target user by means of a message notification, and a method of performing verification during logon to the message page is provided, so that it is difficult for a non-target user to log onto the message page to view specific content of the message, preventing the non-target user from viewing the specific content of the message by means of the message notification when the message notification is forwarded to the non-target user, and ensuring information security.

2) A right of each target user with respect to a requested service is verified based on a message right management policy. A response is controlled according to a determining result, realizing a technical effect of targeted control over the service request of the target user. For a message created by the source user, the source user can still control an access right with respect to the message after sending the message, thereby effectively ensuring information security.

BRIEF DESCRIPTION OF THE DRAWINGS

FIG. 3c shows a third schematic diagram of a target user performing message logon by using a target user client according to an embodiment;

DETAILED DESCRIPTION

Figure 1A:
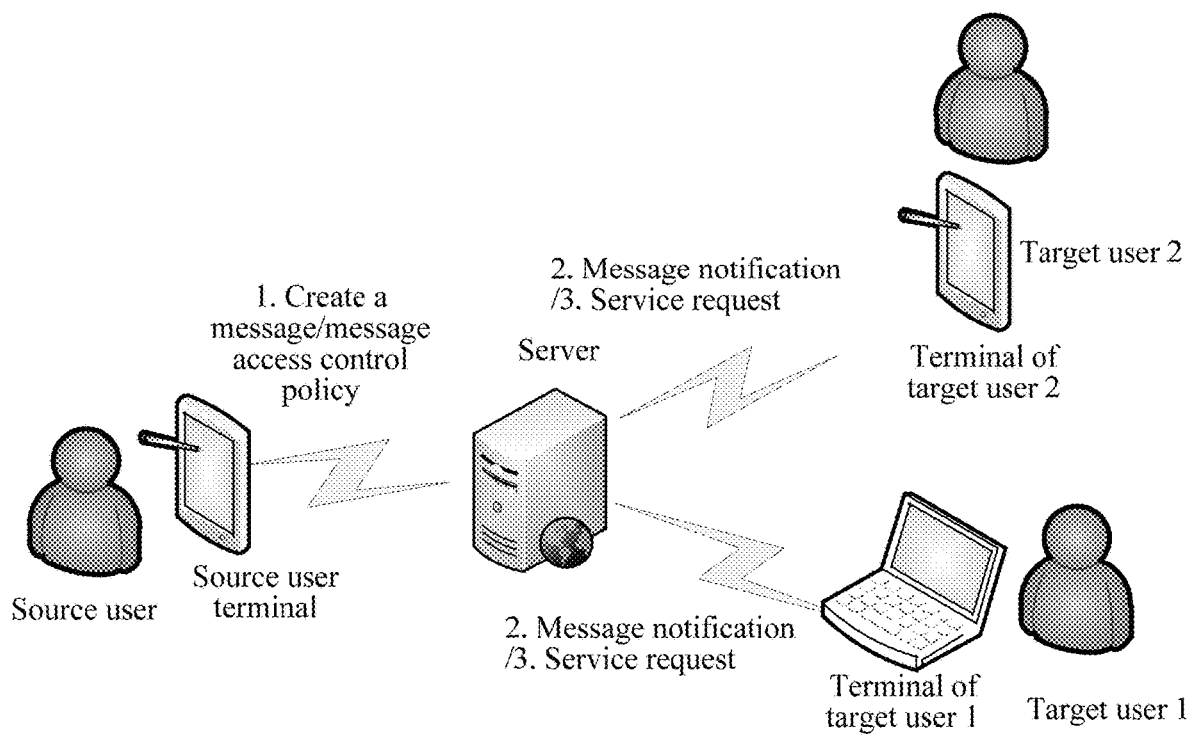
FIG. 1a shows a schematic diagram of an optional scenario of a message right management method according to an embodiment.

The present disclosure is described in detail below with reference to the accompanying drawings and embodiments. It should be understood that, the specific embodiments described herein are merely used for illustrating the present disclosure, but are not intended to limit the present disclosure.

Described in detail herein are the nouns and terms related to the disclosed embodiments. The nouns and terms related to the embodiments apply to the illustration as follows.

1) A terminal includes a device running a client that supports sending and receiving messages in a social platform, for example, a smart phone or a tablet computer. The client includes many forms, for example: a mobile application (App), a webpage-based mobile App (i.e., Web App), a personal PC App, and an in-vehicle terminal App.

2) A source user and a target user are a sender and a receiver of a corresponding message. It can be understood that, the source user and the target user are relative concepts. For example, a source user of one message may be a target user of another message.

3) A message right management policy is a policy used by the source user to control an access right of the target user with respect to the message, and includes a user identifier of the target user as well as rights of the target user with respect to the message.

4) A message is used for carrying various forms of multimedia information (or media information addresses) such as a text, a video, and an audio. An access manner of viewing the message by means of a message page is provided for the target user.

5) A message notification carries a digest of the message, and carries information of a message page (such as an address of the message page). The message notification reaches the target user, so as to indicate that the source user has created a message and the target user can log onto the message page to view the message.

6) A group is, for example, a multi-user session formed in the social platform for sharing messages; for another example, a group is an information aggregation function (also referred to as news) for aggregating news of specific users in the social platform, such as friends and followed users, and when the group is used for aggregating news of friends, it is also referred to as Moments.

Using a social client as an example, a source user shares content with a target user by using a message. The message is sent to a single or a multi-user session in the social platform or sent to Moments, so as to share the message. The message may further carry an address of a HyperText Markup Language 5 (HTML5) page. The target user may view the specific content by using the address, so as to complete display and interaction of rich media carried in the message. According to types of content carried in messages, the messages are categorized into the following types (definitely, types of general messages herein are not limited to the following examples):

graphic and text message: including pictures and texts;
audio message: including an audio;
file message: including a file;

announcement message: sent content includes an announcement; and task message: sent content includes a task used for instructing to complete a specific operation in a network, for example, performing operations such as noting, purchasing, and commenting on a specified webpage.

Currently, optional sending objects of a message mainly includes: a single user, a multi-user session, and Moments. For a message sent to a single user, the user may randomly replicate and forward the message after receiving the message. For a message sent to a multi-user session, any user in the multi-user session to which the message is sent can read message content, and can also replicate and forward the message. For a message sent to Moments, the situation is similar to that of a message sent to a multi-user session.

It can be seen that, once a message is sent out, a user sending the message can no longer control the message, and the following problems may be incurred:

1) A message originally intended to be obtained by a specified user may be disclosed by the receiving user to others, affecting information security.

2) When a user sends a message to a multi-user session, there may be a user who does not need/want to receive the message in the multi-user session, while it increases sending costs and affects communication efficiency to specifically establish a temporary multi-user session. It makes management inconvenient if too many temporary multi-user sessions are established.

3) Once a message is sent, a user cannot withdraw the message after a period of time.

In a scenario in which a source user sends a message to users (namely, target users) in a group according to an embodiment, the source user hopes to control message rights of the target users (namely, rights possessed by the target users with respect to the message) after the message is sent, and carry out targeted control at a user-based granularity. For example, if the message is uniformly sent to clients of the users in the group, the source user allows some users in the group to have a right to view the message, and some users to have a right to forward the message.

In view of the foregoing problem, the embodiments provide a message right management method, a device using the message right management method, and a storage medium. Any type of information (such as a text, an audio, and a file mentioned above) is encapsulated in a message, and then rights (such as accessibility, a reading right, and a forwarding right) of the message are limited, to achieve the purpose of controlling message rights. On the other hand, in a specific scenario, a function of controlling access to a message of a specific type, such as a message carrying a file. Implementation of message right control and types of rights will be described in detail below.

Referring to FIG. 1a, FIG. 1a is a schematic diagram of an optional scenario of a message right management method according to an embodiment. A message right management device may be implemented as a server and a terminal shown in FIG. 1a. A source user terminal runs a social client to support a source user to create messages, for example, various types of messages described above, and send a message notification to users in a group by using the server.

FIG. 1a shows a target user 1 and a target user 2. A terminal device of the target user also runs a social client, so as to actively obtain a message notification or receive a message notification pushed by the server. The message notification carries a digest of the message created by the source user, for example, including a message source user, a picture carried in the message, a keyword of a text carried in the message, and an address of a message page.

After receiving the message notification, the target user 1 and the target user 2 send service requests for the message to the server by using their social clients. The server determines, according to a message right control policy, respective rights (also referred to as message rights herein) possessed by the target user 1 and the target user 2 with regard to the message, and specifically responds to the service requests of the target user 1 and the target user 2.

Figure 1B:
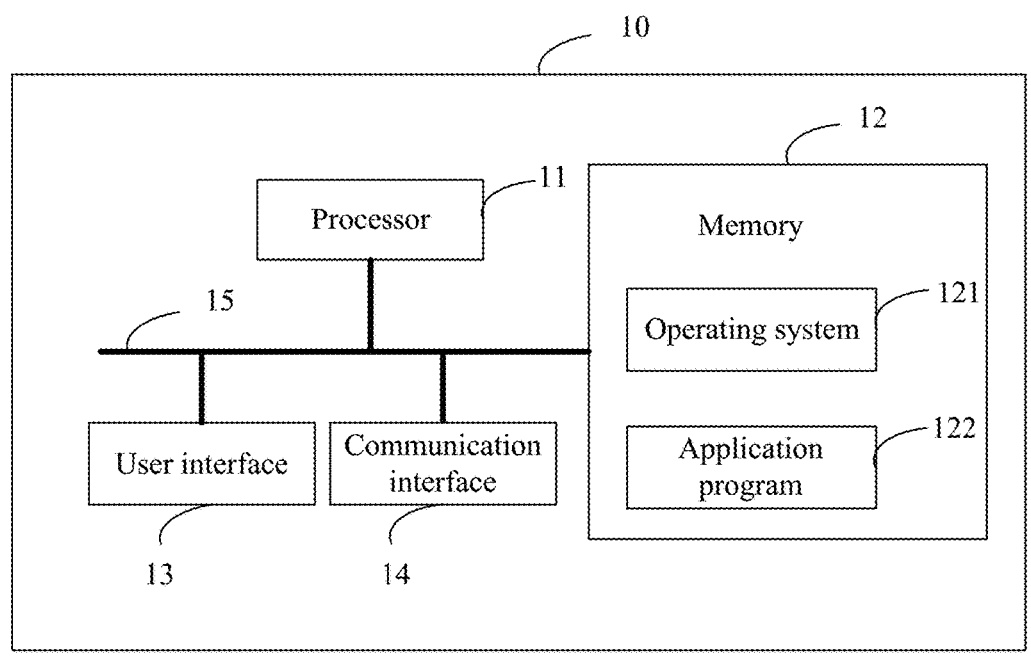
FIG. 1b shows a schematic diagram of an optional hardware structure of a server for message right management according to an embodiment.

Referring to FIG. 1b, FIG. 1b is a schematic diagram of an optional hardware structure of a server/terminal for message right management according to an embodiment. The hardware structure shown in FIG. 1b includes: at least one processor 11, a memory 12, at least one communication interface 14, and a user interface 13. The shown components are coupled together by means of a bus system 15. It can be understood that, the bus system 15 is configured to implement connection communication between these components. In addition to a data bus, the bus system 15 further includes a power bus, a control bus, a status signal bus. However, for the purpose of clear description, various buses in FIG. 1b are all marked as the bus system 15.

The user interface 13 may include a display, a keyboard, a mouse, a track ball, a click wheel, a press key, a press button, a touch panel, a touch screen, or the like.

It can be understood that, the memory 12 may be a volatile memory or a non-volatile memory, and may also include both a volatile and a non-volatile memory. The memory 12 described in this embodiment is intended to include, but not limited to, these and any other appropriate types of memories.

The memory 12 in this embodiment is configured to store various types of data, so as to support operations of the server/terminal. Examples of the data include: any computer program used for operation, such as an operating system 121 and an application program 122; contact data of a social platform, and the like. The operating system 121 includes various system programs such as a framework layer, a core library layer, and a driver layer, to implement various basic services and process hardware-based tasks. The application program 122 may include various application programs, and a program for implementing the message right management method in this embodiment may be included in the application program 122.

The message right method disclosed in this embodiment may be applied in the processor 11 or implemented by the processor 11. The processor 11 may be an integrated circuit chip having a signal processing capability. In an implementation process, steps in the foregoing method may be completed by using a hardware integrated logic circuit in the processor 11 or a software instruction. The processor 11 may be a general-purpose processor, a digital signal processor (DSP), or another programmable logic device (PLD), a discrete gate, a transistor logic device, a discrete hardware component, or the like. The processor 11 may implement or execute the methods, steps and logic block diagrams described in the embodiments. The general-purpose processor may be a microprocessor, any conventional processor, or the like. The method steps described with reference to the embodiments may be directly accomplished by a hardware decoding processor, or accomplished by a combination of hardware in a decoding processor and a software module. The software module may be located in a storage medium. The storage medium is located in the memory 12. The processor 11 reads information in the memory 12, and accomplishes steps in the foregoing message right management method together with hardware.

In an exemplary embodiment, the hardware structure shown in FIG. 1b may be implemented by one or more application specific integrated circuits (ASICs), a DSP, a PLD, a complex programmable logic device (CPLD), a field-programmable gate array (FPGA), a general-purpose processor, a controller, a micro controller unit (MCU), a microprocessor, or another electronic element, for executing the foregoing message right management method.

Figure 2:
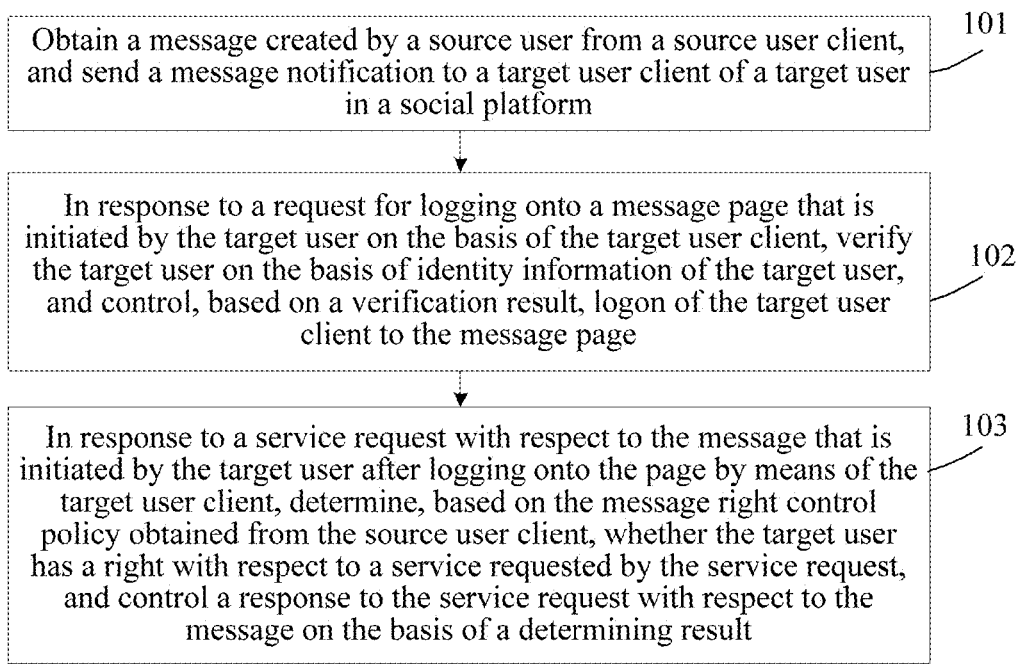
FIG. 2 shows a first schematic flowchart of a message right management method according to an embodiment.

FIG. 2 is a schematic flowchart of a message right management method according to an embodiment. With reference to FIG. 1a, the message right management method in this embodiment includes the following steps:

Step 101: Obtain a message created by a source user from a source user client, and send a message notification to a target user client of a target user in a social platform.

The source user creates a to-be-sent message in a client. The client sends a message notification to a target user client by using a server, so that a target user knows that there is a message to be read. According to the quantity of target users of the message set by the source user, there may be one or more target user clients receiving the message. For example, when the source user specifies in the client that the message is sent to a group including multiple users, multiple target user clients will receive the message.

In this embodiment, a message right control policy may be set when the user creates the message, before the user creates the message or after the user creates the message. The message right control policy is used for controlling an access right with respect to the message.

For example, the message right management policy set by the source user is only valid for a current message sent by the source user; or the message right control policy set by the source user may be valid with respect to one or more messages created by the source user, or valid for messages created within a preset period of time after the source user sets the message right control policy.

Definitely, the message right control policy may also be valid with respect to global messages. That is, after the source user sets the message control policy, the policy is valid with respect to all messages that are created and sent by the source user.

In an optional embodiment, while obtaining the message created by the source user from the source user client, the server may also obtain a message right control policy with respect to the message, so as to perform access control over the message on the basis of the policy. Alternatively, the server may obtain a global message right control policy before obtaining messages, so as to perform, based on the policy, access control on all messages sent by the source user.

For example, that the server obtains the message right control policy from the source user client includes:

the server obtains at least one of the following types of message rights set by the source user with respect to the message from the source user client: a right to view the message, and a right to forward the message; and obtains the type of the message right set by the source user from the source user client, and a user having the message right of the corresponding type, that is, a user identifier corresponding to the message right of the corresponding type.

The type includes at least one of the following: a user identifier having an access right with respect to the message; a user identifier having no access right with respect to the message; and only the source user has the message right with respect to the message. The user identifier is denoted as UserID, which is a unique identifier for verifying the access right of the target user with respect to the message, and corresponds to a device ID of a terminal of the target user in a one-to-one manner. The device ID of the terminal of the target user is a character string that identifies the uniqueness of the device. As such, it is equivalent to that the source user sets a list of users allowed to view and/or forward messages created by the source user.

For example, while obtaining a view right set by the source user with respect to the message from the source user client, the server may obtain UserIDs of specified users who have no access right with respect to the message, which is equivalent to that the source user sets a view blacklist for the message, that is, none of the users in the blacklist can view the message. In another embodiment, when obtaining a forward right and view right that are set by the source user with respect to the message from the source user client, the server may obtain UserIDs of specified users who have the access right with respect to the message, which is equivalent to that the source user sets a white list with for the message, that is, all the users in the white list can view and forward the message.

Step 102: In response to a request for logging onto a message page that is initiated by the target user on the basis of the target user client, verify the target user on the basis of identity information of the target user, and control, based on a verification result, logon of the target user client to the message page.

Herein, when receiving the message notification by means of the target user client, the target user wants to access the message. First, the identity of the target user needs to be verified, that is, request for logging onto the message page is sent to the server. The page may be an App page, a PC webpage, or an H5 page within a social client. The request carries at least one of the following identity information of the target user client: a social platform identifier of the target user, and a device identifier of the target user. The social platform identifier is a unique identifier of a user in the social platform, or is a unique identifier that a user uses for message login. For example, if the social client is WeChat, the identifier may include a WeChat identifier of the user, that is, a Union ID; a WeChat account registered by the user, which may be obtained by invoking an application programming interface (API) of WeChat; and so on. The device identifier of the target user is a device ID of a target user terminal of the target user, and may be obtained by calculation using a preset algorithm.

As an example of determining whether the target user is a legal user, according to user login information stored in a database and based on a social platform identifier (such as a WeChat account) of the target user, the server determines whether the target user has already registered with the social platform; if yes, the server determines that the target user is a legal user of the social platform; if no, the server determines that the target user is an illegal user of the social platform. For example, when it is determined that the user login information stored in the database includes the social platform identifier of the target user, the target user is considered as a legal user of the social platform; otherwise, the target user is an illegal user.

As another example of determining whether the target user is a legal user, according to user login information stored in a database and based on a social platform identifier of the target user, the server determines whether the target user has already registered with the social platform; if no, the server determines that the target user is an illegal user of the social platform; and if yes, the server determines, based on the device ID of the target user terminal, whether device ID of the target user terminal is an ID of a terminal that the target user uses to log onto the social platform. If yes, the server determines that the target user is a legal user of the social platform, otherwise the server determines that the target user is an illegal user of the social platform. For example, when it is determined that the user login data stored in the database includes the device ID of the target user terminal, the target user is considered as a legal user of the social platform; otherwise, the target user is an illegal user.

It can be understood that, one of the foregoing manners for determining whether the user is a legal user can be used, or the manners can be used in combination.

In an optional embodiment, when the verification result represents that the target user is a legal user of the social platform, a user identifier for logging onto the message page is allocated to the target user client on the basis of the social platform identifier of the target user, and the message page is logged onto for the target user client by using the allocated user identifier.

When the verification result represents that the target user is an illegal user of the social platform, the target user client is forbidden to log onto the message page, and a prompt that the target user does not have a right to log onto the message page is sent to the target user client.

Figure 3A:
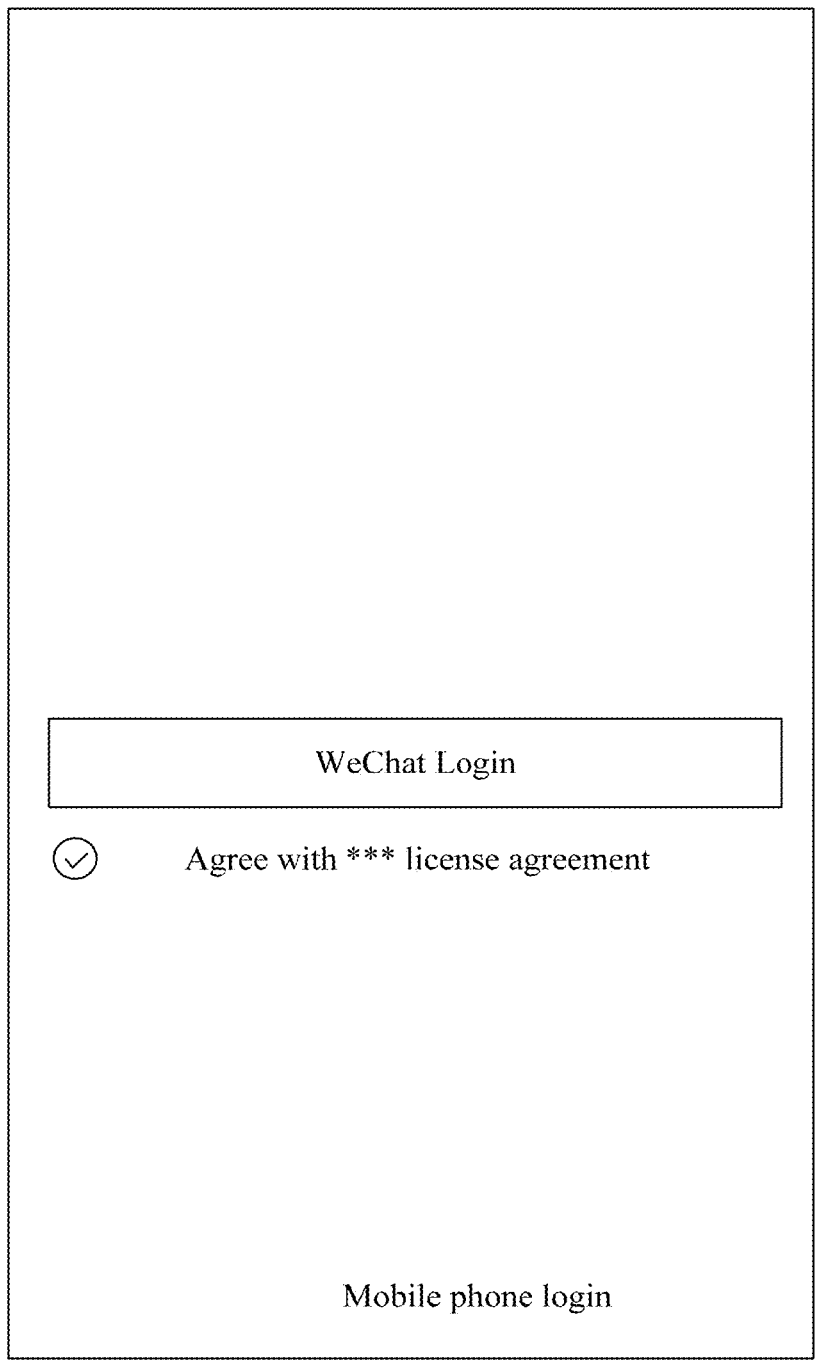
FIG. 3a shows a first schematic diagram of a target user performing message logon by using a target user client according to an embodiment.
Figure 3B:
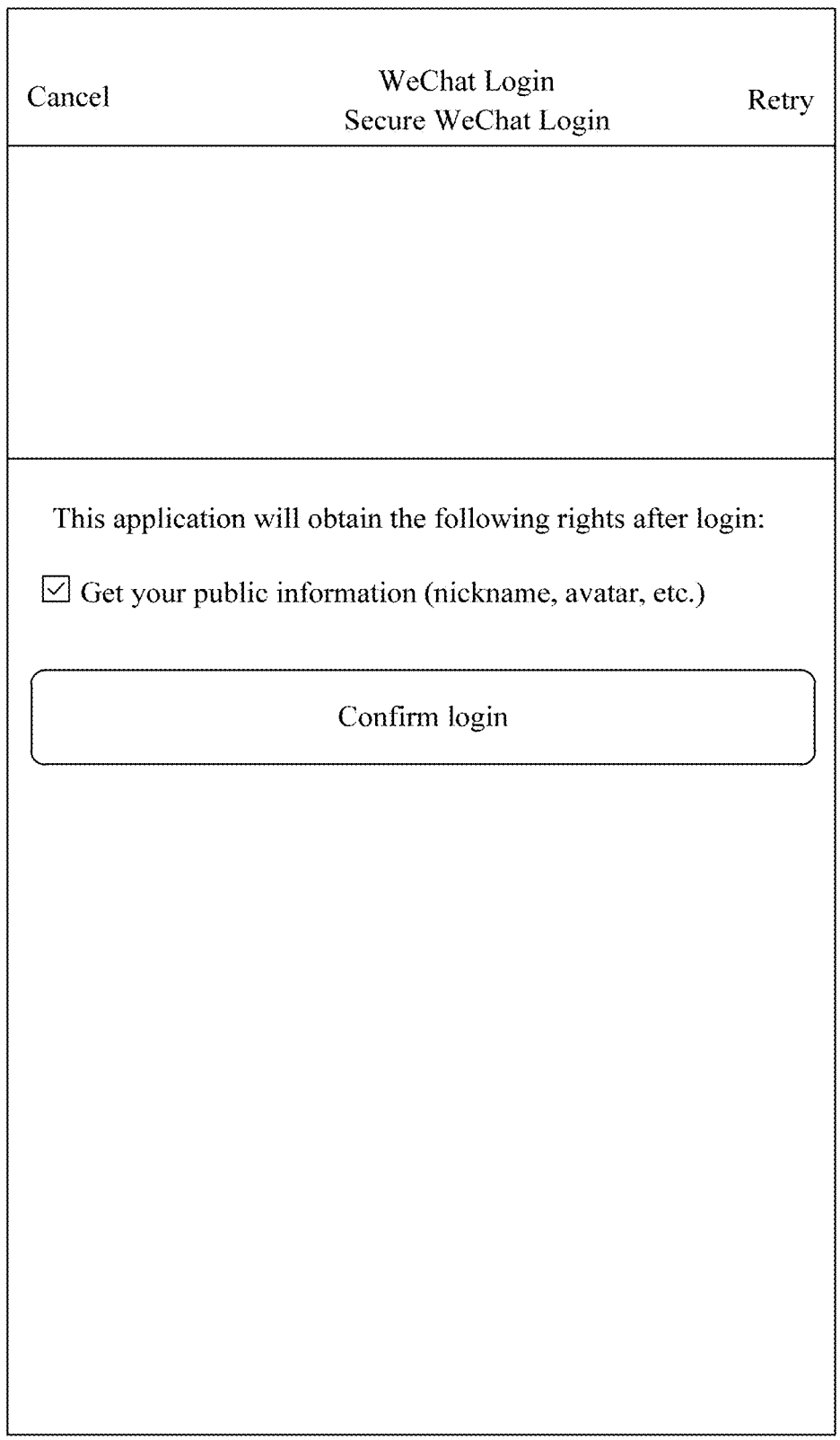
FIG. 3b shows a second schematic diagram of a target user performing message logon by using a target user client according to an embodiment.

For example, the target user receives, in a third-party APP, a message notification sent by the source user, and authorizes, on an H5 page of the third-party APP, login to a WeChat account to view the message. An implementation process of logging onto a message page in WeChat is shown in FIG. 3a to FIG. 3c. In FIG. 3a, after receiving a message notification in a third-party APP, the target user clicks the message notification to trigger logon to the message page by using a WeChat account of the target user. In FIG. 3b, the server presents a prompt of obtaining authorization for login to the WeChat account from the target user. In FIG. 3c, the server logs onto the message page for the target user after verifying the target user successfully. The message page displays a digest of the message, such as a source user, the type of file included in an attachment, a sending time point, and the quantity of users who have already read the message.

FIG. 3a to FIG. 3c show that the target user receives a message notification in a third-party APP, authorizes login to the WeChat account, and logs onto the message page. It should be noted that, when the target user logs onto the message page by using an H5 page in a social client (such as WeChat) of the target user, a WeChat authorization interface will be directly presented while skipping the logon interface that displays the prompt of obtaining authorization from the target user as shown in FIG. 3a.

It can be seen that, the message created by the source user reaches the target user by means of the message notification, and a method of performing verification during logon to the message page is provided, so that it is difficult for a non-target user to log onto the message page to view specific content of the message, preventing the non-target user from viewing the specific content of the message by means of the message notification when the message notification is forwarded to the non-target user, and ensuring information security.

Step 103: In response to a service request with respect to the message that is initiated by the target user after logging onto the page by means of the target user client, determine, based on a message right control policy obtained from the source user client, whether the target user has a right corresponding to a service requested by the service request, and control a response to the service request with respect to the message on the basis of a determining result.

Herein, the service request includes: a view request for viewing specific content of the message, and a forward request for forwarding the message notification. After passing identity information verification performed by the server, the target user client may send a view request and/or forward request with respect to the message to the server, and the server makes a judgment on a message right of the target user.

In actual implementation, based on the type of the right set in the message right control policy by the source user with respect to the message as well as the user identifier corresponding to the type, the server determines whether the target user has a right corresponding to a service requested by the service request. For example, a user identifier that is used for logging onto the page and that is allocated to the target user client in the logon process is matched with the user identifier in the message right control policy. If the matching fails, it indicates that the user does not have any right. If a corresponding identifier is found in the message right control policy during matching, a type of a right associated with the identifier in the message right control policy is matched with the right corresponding to the service requested by the service request; if the matching succeeds, it is determined that the target user has the right corresponding to the service requested by the service request; if the matching fails, it is determined that the target user does not have the right corresponding to the service requested by the service request.

For example, a view right with respect to the message as well as a user identifier of a user having the view right are set in the message right control policy. A user identifier that is allocated to the target user client for logging on to the page is matched with the user identifier of the user having the view right. When the matching succeeds, it is determined that the target user has the right to view the message; if the matching fails, it is determined that the target user does not have the right to view the message.

Figure 4A:
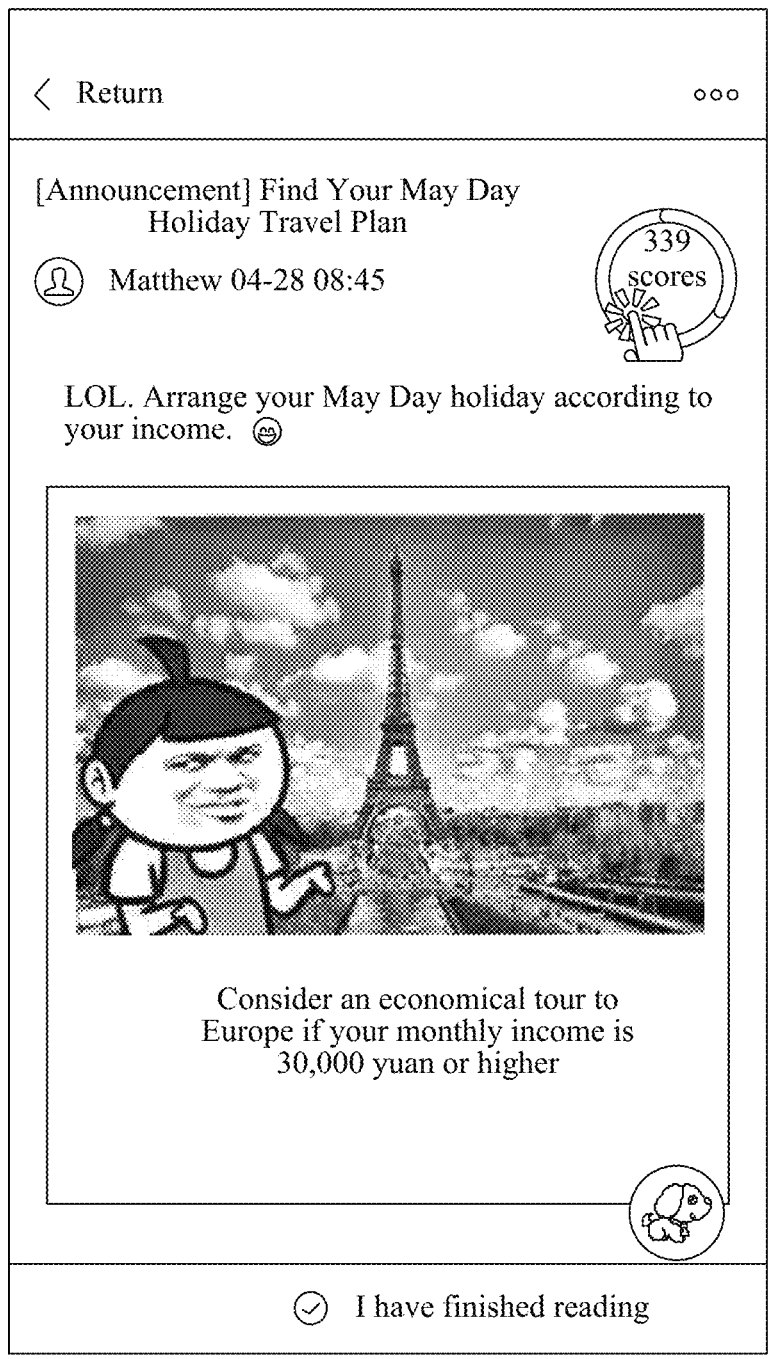
FIG. 4a shows a first schematic diagram of a request result obtained after a target user requests a service by using a target user client according to an embodiment.

For example, when the target user has the right corresponding to the service requested by the service request, the server returns data of the service requested by the service request to the target user client. FIG. 4a is a schematic diagram in which the service request of the target user succeeds. When the target user clicks a message on the message page, the server verifies that the target user has the view right, and then sends specific content of the message to the target user client.

Figure 4B:
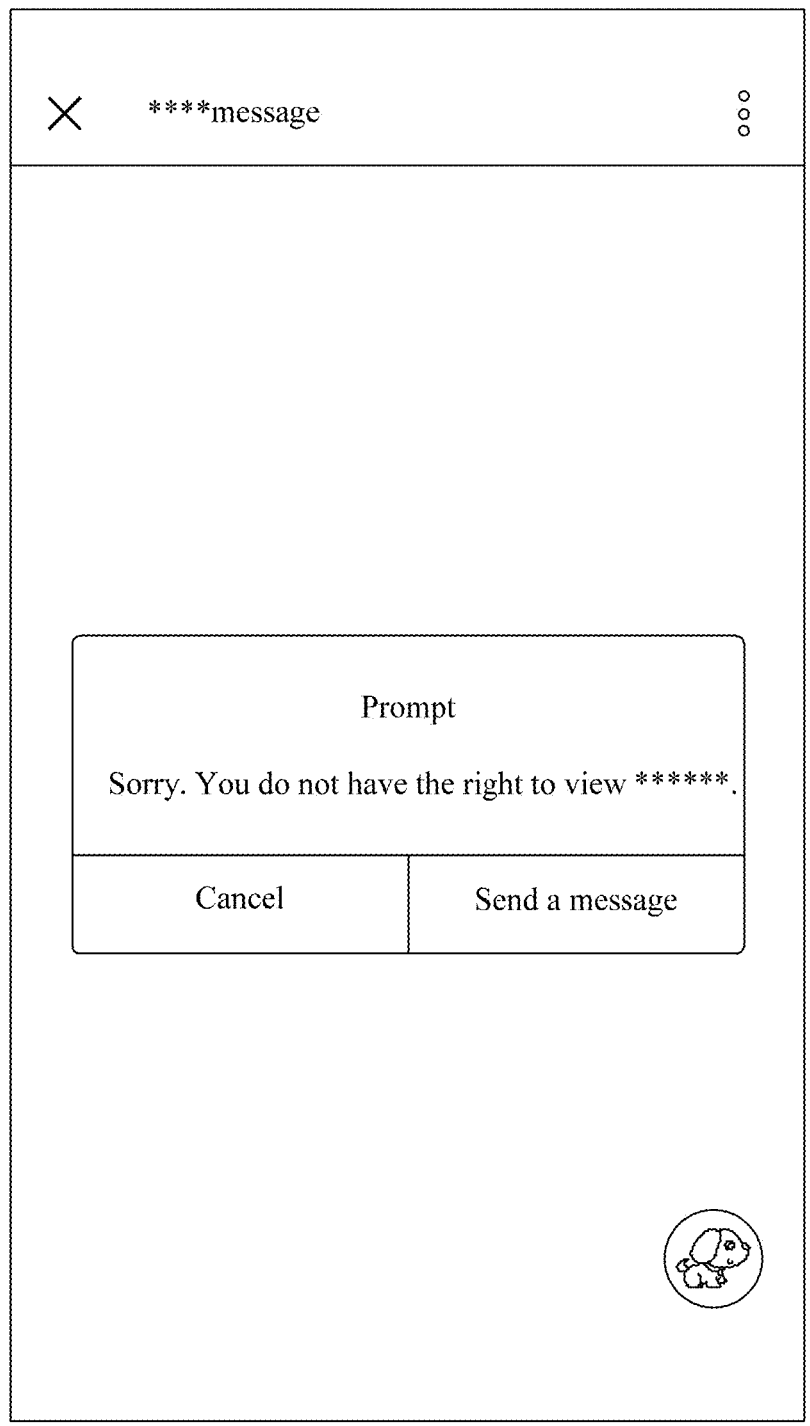
FIG. 4b shows a second schematic diagram of a request result obtained after a target user requests a service by using a target user client according to an embodiment.

For example, when the target user does not have the right corresponding to the service requested by the service request, the service request with respect to the message is blocked, and an illegal service request prompt is sent to the target user client. FIG. 4b is a schematic diagram in which the service request of the target user client fails. When clicks a message on the message page, the server verifies that the target user does not have the view right, and then returns a prompt that the target user does not having the view right to the target user client.

A right of each target user with respect to the requested service is verified based on a message right management policy. A response is controlled according to a determining result, realizing a technical effect of targeted control over the service request of the target user. For a message created by the source user, the source user can still control an access right with respect to the message after sending the message, thereby effectively ensuring information security.

Figure 5:
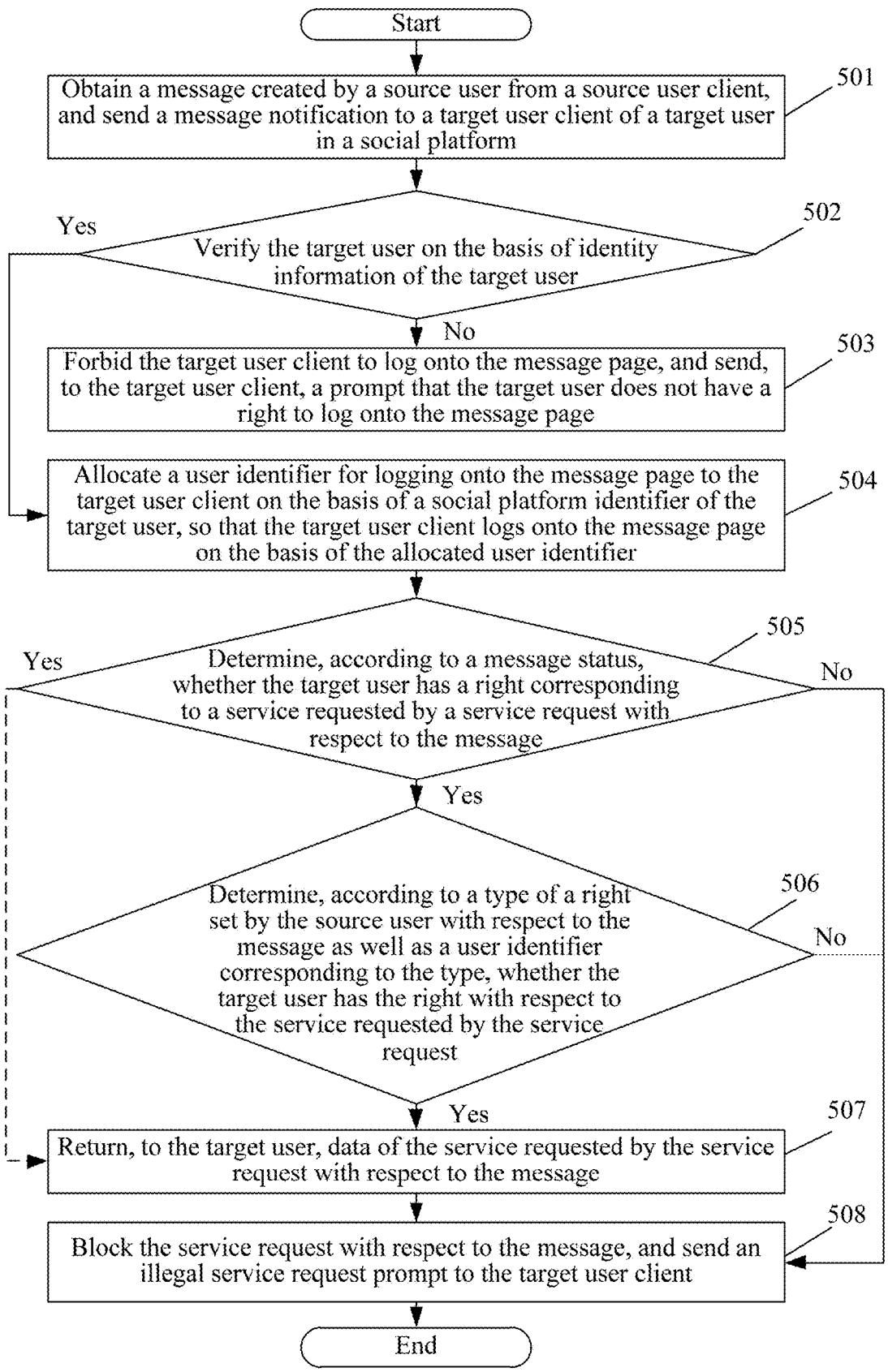
FIG. 5 shows a second schematic flowchart of a message right management method according to an embodiment.

In an optional embodiment, in addition to determining, according to the type of the right included in the message right control policy as well as the corresponding user identifier having the right, whether the user has the right of the requested service with respect to the message, the determining may also be performed with reference to a message status in the message right control policy. A description is made with reference to a specific example. Referring to FIG. 5, FIG. 5 is a schematic flowchart of a message right management method according to an embodiment, including the following steps:

Step 501: Obtain a message created by a source user from a source user client, and send a message notification to a target user client of a target user in a social platform.

Step 502: In response to a request for logging onto a message page that is initiated by the target user on the basis of the target user client, verify the target user on the basis of identity information of the target user, to determine whether the target user passes the verification; if the target user does not pass the verification, perform step 503; and if the target user passes the verification, perform step 504.

Step 503: Forbid the target user client to log onto the message page, send, to the target user client, a prompt that the target user does not have a right to log onto the message page, and end processing.

Step 504: Allocate a user identifier for logging onto the message page to the target user client on the basis of a social platform identifier of the target user, so that the target user client logs onto the message page on the basis of the allocated user identifier.

Step 505: In response to a service request initiated by the target user client with respect to the message, obtain, from a message right control policy set by the source user client, a message status set by the source user with respect to the message; determine, according to the message status, whether the target user has a right corresponding to a service requested by the service request with respect to the message; if yes, perform step 506 or step 507; otherwise, perform step 508.

As an example, the message status includes a visible state and an invisible state; if the message is in a visible state, it is determined that the target user has the right corresponding to the service requested by the service request with respect to the message (step 507 is performed correspondingly). Alternatively, it is continuously determined whether a correspondence between a right type and a user identifier in the control policy matches a correspondence between a type of the right corresponding to the service requested by the target user and an identifier of the target user (corresponding to step 506).

Herein, the source user sets a visible state and an invisible state of the message, and this is equivalent to setting, for the message, a switch for enabling the target user to have the message right or disabling the target user from having the message right. Therefore, when the message is in an invisible state, even if the target user passes the identify verification and logs onto the message page successfully, the target user does not have the right corresponding to the service requested by the service request with respect to the message, that is, the target user cannot view/forward the message. This manner is applicable to a scenario in which the source user needs to view/forward the message. Although the source user has sent the message, the message can only be regarded as information stored in a manner similar to a cloud storage created by the source user, to prevent the information from being lost.

In another example, the message status includes: whether the message is in a withdraw state.

If the source user does not set the message to be in a withdraw state, it is determined that the target user has the right corresponding to the service requested by the service request with respect to the message (step 507 is performed correspondingly). Alternatively, it is continuously determined whether a correspondence between a right type and a user identifier in the control policy matches a correspondence between a type of the right corresponding to the service requested by the target user and an identifier of the target user (corresponding to step 506).

If the message is in the withdraw state set by the source user, it is determined that the target user does not have the right corresponding to the service requested by the service request with respect to the message.

Herein, the state of the message may be set by the user. As such, when the source user sends out and then withdraws the message by using the source user client, the server can inform the target user in time that the target user does not have the requested right (view and/or forward), achieving a technical effect that the source user can withdraw the message at any time after the message is sent out.

Step 506: Determine, according to a type of a right set by the source user in the message right control policy with respect to the message as well as a user identifier corresponding to the type, whether the target user has the right corresponding to the service requested by the service request; if yes, perform step 507; otherwise, perform step 508.

Step 507: Return, to the target user client, data of the service requested by the service request with respect to the message, and end processing.

Step 508: Block the response to the service request with respect to the message, and send an illegal service request prompt to the target user client.

It can be understood that, when the determining result in step 505 is yes and then step 506 is performed, it means whether the target user has the right corresponding to the requested service is determined by using the message status as well as the correspondence between the right type and the user identifier; when the determining result in step 505 is yes and then step 507 is performed, it means whether the user has the right corresponding to the requested service is determined by using the message status only.

It is easy to understand that, when whether the user has the right corresponding to the requested service is determined by using the message status only (that is, when the determining result in step 505 is yes, step 507 is performed while step 506 is not performed), as long as the message status is a predetermined state (such as a visible state, or a non-withdraw state), the target user has the right corresponding to the requested service. When whether the user has the right corresponding to the requested service is determined by using the message status in combination with the correspondence between the right type and the user identifier (that is, when the determining result in step 505 is yes, step 506 is performed), a function of enabling and disabling the allocation of the message right is implemented, thereby supporting the source user to flexibly control whether the message is visible and withdraw the message at any time after sending the message.

Figure 6:
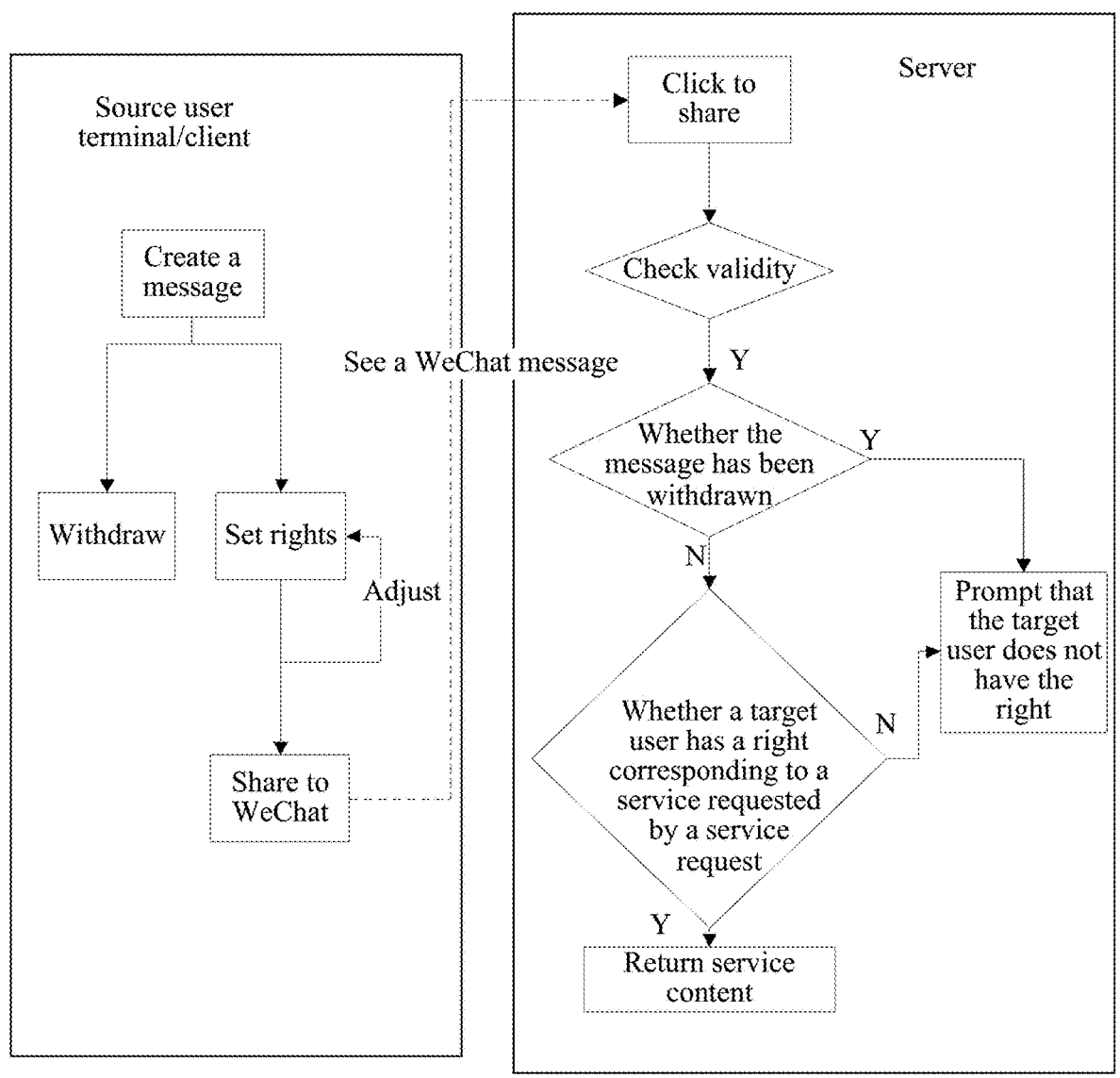
FIG. 6 shows a third schematic flowchart of a message right management method according to an embodiment.

Further referring to FIG. 6, FIG. 6 is a schematic flowchart of a message right management method in this embodiment. A source user, namely, a message sender, creates a WeChat message, sets a message right control policy with respect to the message, and sends, based on a source user client, a WeChat message notification to a target user client by means of a server.

First, the source user client sends the WeChat message and the message right control policy to the server.

Herein, the WeChat message includes the following types: graphic and text message, audio message, file message, announcement message, and task message.

The message right control policy includes: a message right with respect to the WeChat message, a type corresponding to the message right, and a user identifier (namely, User ID) corresponding to the message right of the corresponding type.

The message right includes at least one of the following: a right to view the message; and a right to forward the message.

The type includes at least one of the following: a user identifier of a user having an access right with respect to the message; a user identifier of a user having no access right with respect to the message; and only the source user has the message right with respect to the message.

For example, it is specified in the message right control policy that any user can view and/or forward the message, or only users in a white list (including white list user identifiers) are allowed to view and/or forward the message while the message is invisible to users not on the list, or forbid users in a blacklist (including blacklist user identifiers) to view and/or forward the message while users not on the list can view and/or forward the message, or only the source user is allowed to view and/or forward the message.

Figure 7:
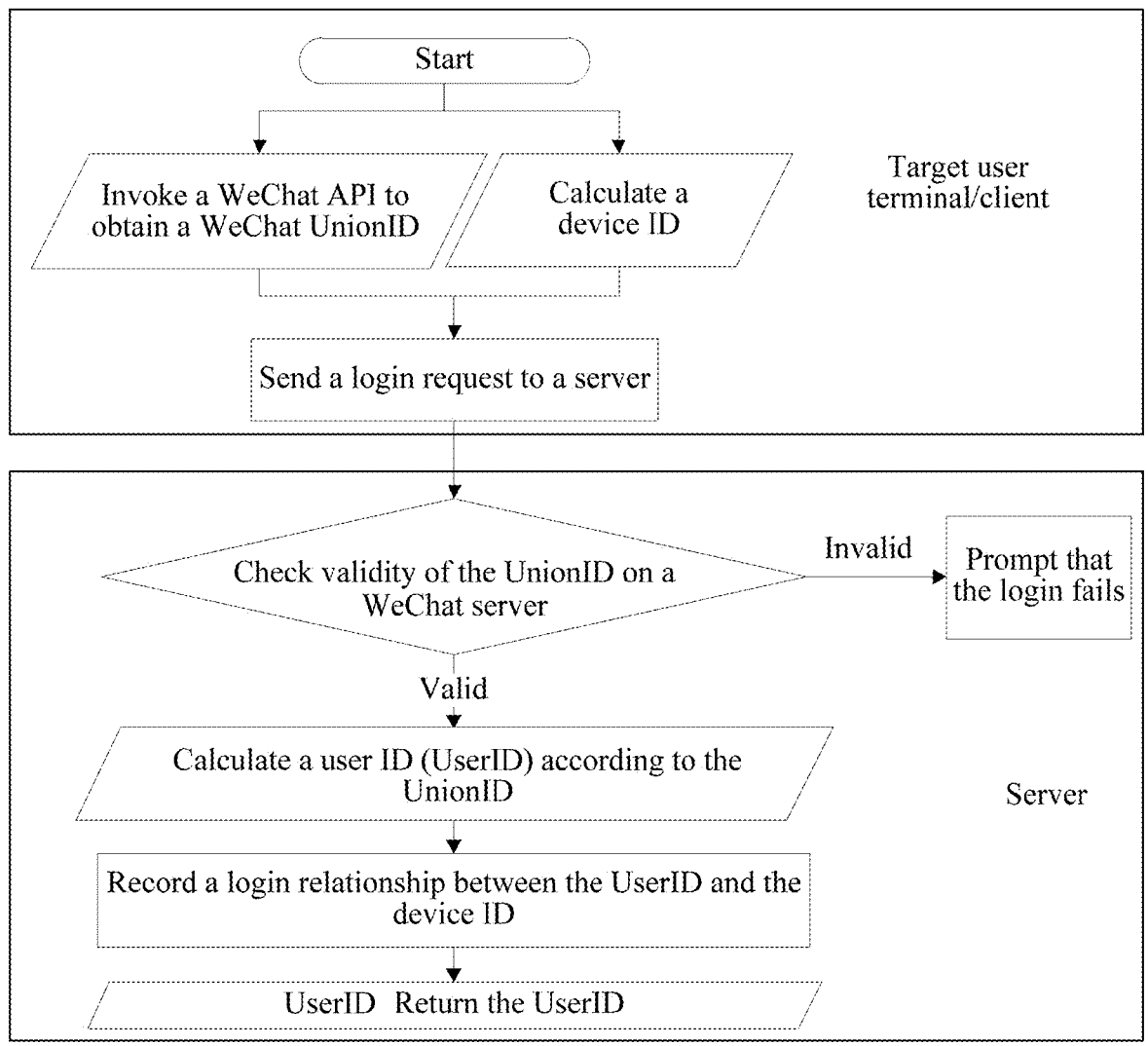
FIG. 7 shows a schematic flowchart of a target user client performing a logon operation to get a legal identity credential in return according to an embodiment.
Figure 8:
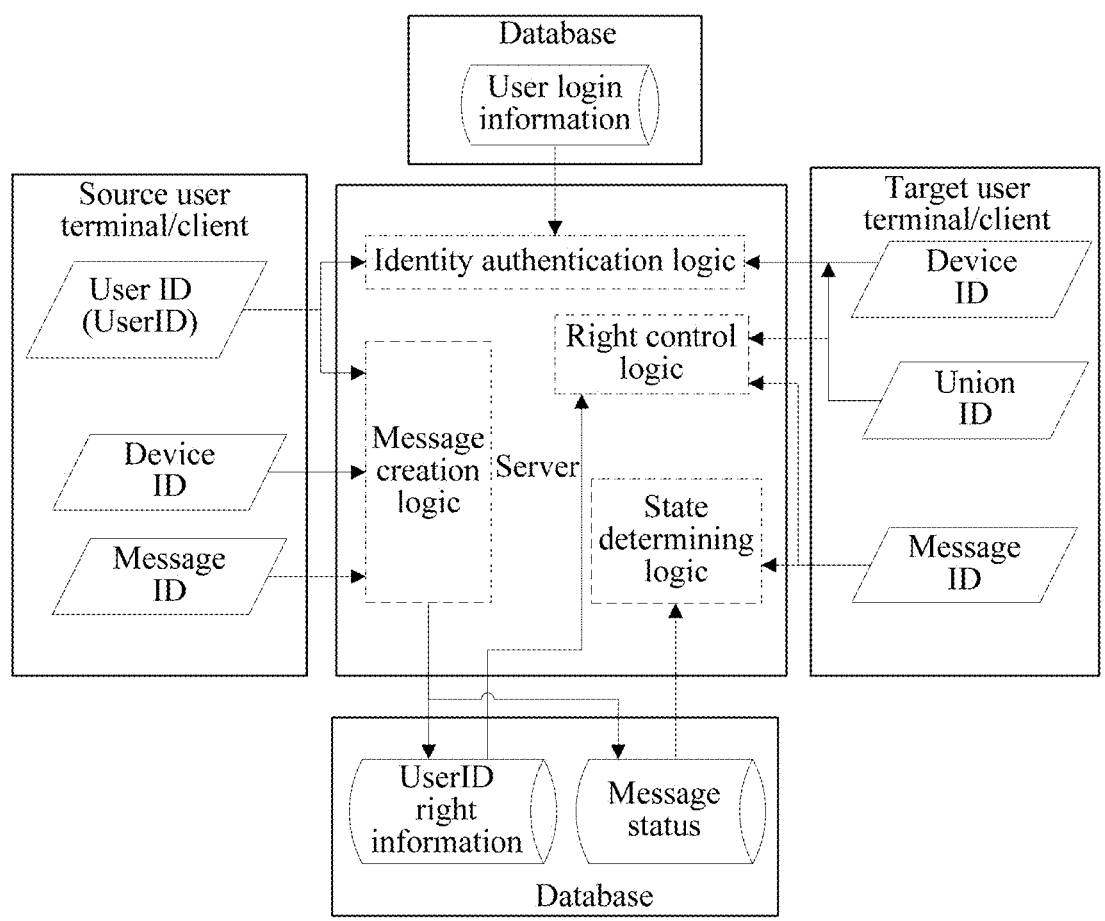
FIG. 8 shows a schematic structural diagram of composition of a message right management system according to an embodiment.

The server sends a notification corresponding to the WeChat message to the target user client. The target user clicks to trigger the target user client to send a logon request to the server, so that the server verifies the identity of the target user. FIG. 7 is a schematic flowchart of a target user client performing a logon operation to get a legal identity credential in return according to this embodiment. FIG. 8 is a schematic structural diagram of composition of a message right management system according to this embodiment.

In FIG. 7, the source user client invokes an API of the WeChat APP to obtain a WeChat Union ID, calculates a device ID of the source user terminal by using a preset algorithm for associating a Union ID and a device ID, and then sends a logon request carrying the Union ID and the device ID to the server.

The server checks validity of the Union ID on the basis of a database storing user logon information (identity authentication logic in FIG. 8). When it is determined that the Union ID is invalid, the server prompts the target user that the logon fails. When it is determined that the Union ID is valid, the server allocates a User ID to the target user on the basis of the Union ID, and at the same time may record a correspondence between the User ID and the device ID. The target user implements message logon by using the target user client. FIG. 3a is a schematic diagram of a logon interface, FIG. 3b is a schematic diagram of a WeChat authorization interface, and FIG. 3c is a schematic diagram of an interface after the logon succeeds. It should be noted that, when the target user logs on by using an H5 page in WeChat on the target user client, a WeChat authorization interface will be directly presented while skipping the logon interface as shown in FIG. 3a. If the user is not a user object to which the message is shared, the user cannot log on, that is, the user is an illegal user in this case.

In FIG. 8, after the target user client logs on successfully, that is, after the target user passes the validity check performed by the server, a message status of the WeChat message is checked on the basis of a message ID of the WeChat message (state determining logic in FIG. 8) is checked, to determine whether the WeChat message is withdrawn by the source user. If the WeChat message is withdrawn, the server prompts the target user that the target user does not have the access right. If the WeChat message is not withdrawn, it is determined whether the target user has a right corresponding to a service requested by a service request (message view request and/or message forward request) (right control logic in FIG. 8). When it is determined that the target user has the right corresponding to the service requested by the service request, corresponding service content is returned. A schematic diagram of successful access to the WeChat message is shown in FIG. 4a. When it is determined that the target user does not have the right corresponding to the service requested by the service request, the server prompts the target user that the target user does not have the access right. A schematic diagram of failed access to the WeChat message is shown in FIG. 4b.

Figure 9:
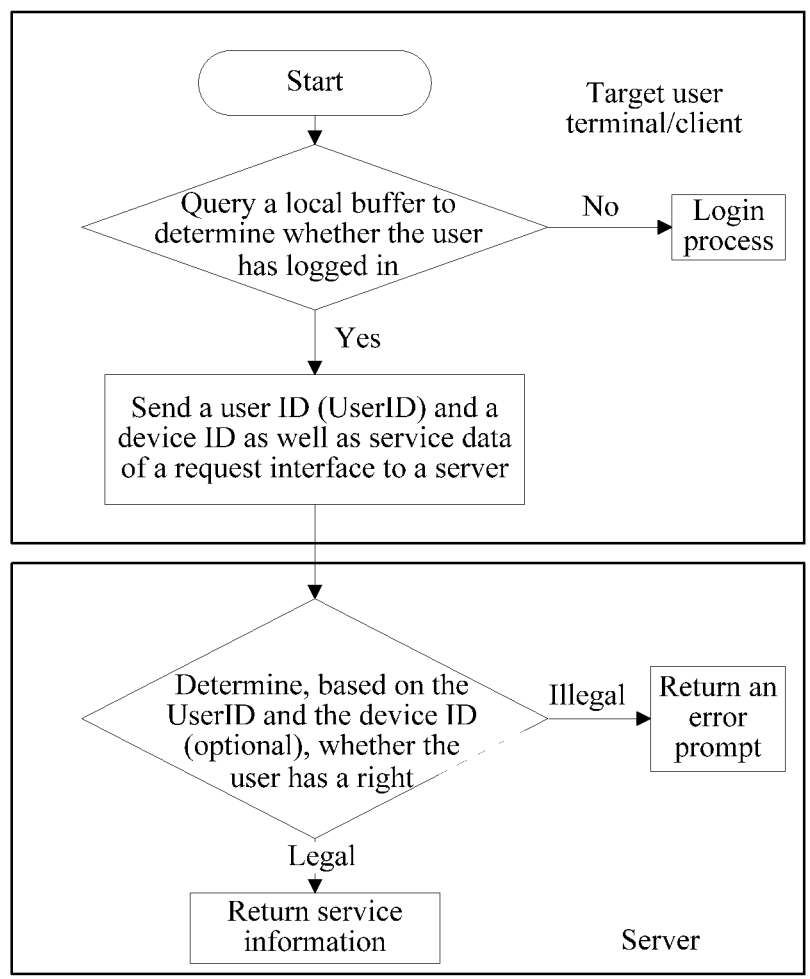
FIG. 9 shows a fourth schematic flowchart of a message right management method according to an embodiment.

It can be understood that, when the server determines whether the target user has the access right, the process of checking the message status of the WeChat message is an optional step. After the target user client logs on successfully, it is directly determined, based on the User ID and device ID (optional), whether the target user has the access right, as shown in FIG. 9. The purpose of querying a buffer is to determine whether the message page is logged on to currently.

Figure 10:
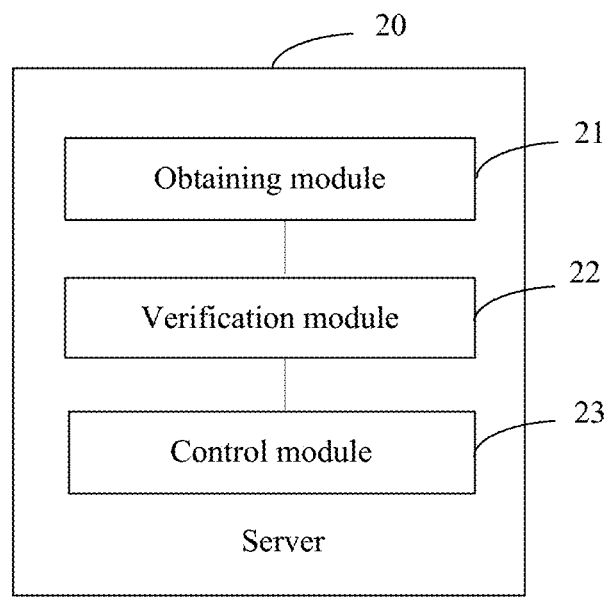
FIG. 10 shows a schematic diagram of a functional structure of a server for performing message right management according to an embodiment.

FIG. 10 is a schematic structural diagram of composition of a server 20 according to an embodiment. As shown in FIG. 10, the composition of the server 20 in this embodiment includes: an obtaining module 21, a verification module 22, and a control module 23.

The obtaining module 21 is configured to obtain a message created by a source user from a source user client, and send a message notification to a target user client of a target user in a social platform.

The verification module 22 is configured to: in response to a request for logging onto a message page that is initiated by the target user on the basis of the target user client, verify the target user on the basis of identity information of the target user, and control, based on a verification result, logon of the target user client to the message page.

The control module 23 is configured to: in response to a service request with respect to the message that is initiated by the target user after logging onto the page by means of the target user client, determine, based on a message right control policy obtained from the source user client, whether the target user has a right corresponding to a service requested by the service request, and control a response to the service request with respect to the message according to a determining result.

In an embodiment, the obtaining module 21 is specifically configured to: obtain at least one of the following types of message rights set by the source user with respect to the message from the source user client: a right to view the message, and a right to forward the message; and obtain the type of the message right set by the source user from the source user client, and a user identifier corresponding to the message right of the corresponding type. The type includes at least one of the following: a user identifier of a user having an access right with respect to the message; a user identifier of a user having no access right with respect to the message; and only the source user has the message right with respect to the message.

In an embodiment, the verification module 22 is specifically configured to obtain at least one of the following identity information of the target user client: a social platform identifier of the target user, and a device identifier of the target user.

It is determined, based on the social platform identifier of the target user, whether the target user is a legal user who has already registered with the social platform; if yes, it is determined that the target user is a legal of the social platform; if no, it is determined that the target user is an illegal user of the social platform.

It is determined, based on the device identifier, whether the target user client is an identifier of a legal terminal used by the target user to log into the social platform; if yes, it is determined that the target user is a legal of the social platform; if no, it is determined that the target user is an illegal user of the social platform.

In an embodiment, the verification module 22 is specifically configured to: when the verification result represents that the target user is a legal user of the social platform, allocate a user identifier for logging onto the message page to the target user client on the basis of the social platform identifier of the target user, and log onto the message page by using the allocated user identifier for the target user client; and when the verification result represents that the target user is an illegal user of the social platform, forbid the target user to log onto the message page, and send, to the target user client, a prompt that the target user does not have a right to log onto the message page.

In an embodiment, the control module 23 is specifically configured to determine, based on the type of the message right set in the message right control policy by the source user with respect to the message as well as the user identifier corresponding to the type, whether the target user has a right corresponding to a service requested by the service request.

In an embodiment, the control module 23 is specifically configured to: obtain, from the message right control policy, a message status set by the source user with respect to the message, where the message status includes a visible state and an invisible state; if the message is in a visible state, determine that the target user has the right corresponding to the service requested by the service request with respect to the message; and if the message is in an invisible state, determine that the target user does not have the right corresponding to the service requested by the service request with respect to the message.

In an embodiment, the control module 23 is specifically configured to: obtain, from the message right control policy, a message status set by the source user with respect to the message, where the message status includes: whether the message is set to be in a withdraw state by the source user; if the source user does not set the message to be in a withdraw state, determine that the target user has the right corresponding to the service requested by the service request with respect to the message; and if the source user sets the message to be in a withdraw state, determine that the target user does not have the right corresponding to the service requested by the service request with respect to the message.

In an embodiment, the control module 23 is specifically configured to: when the target user has the right corresponding to the service requested by the service request with respect to the message, return, to the target user client, data of the service requested by the service request with respect to the message; and when the target user does not have the right corresponding to the service requested by the service request with respect to the message, block the response to the service request with respect to the message, and send an illegal service request prompt to the target user client.

Figure 11:
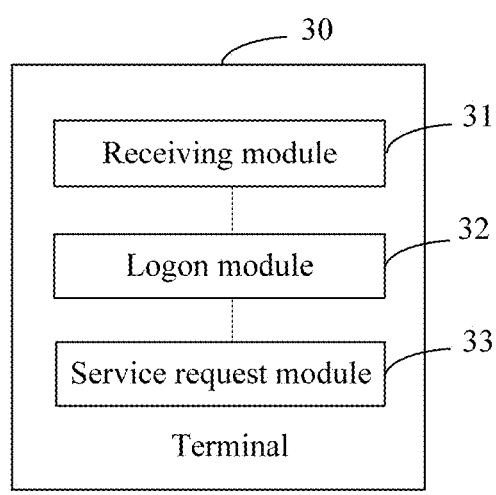
FIG. 11 shows a schematic diagram of a functional structure of a terminal according to an embodiment.

FIG. 11 is a schematic structural diagram of composition of a terminal 20 according to an embodiment. As shown in FIG. 11, the composition of the terminal 30 in this embodiment includes: a receiving module 31, a logon module 32, and a service request module 33.

The receiving module 31 is configured to receive, from a social platform, a message notification corresponding to a message created by a source user.

The logon module 32 is configured to: in response to a logon instruction of the target user, initiate a request for logging onto a message page, so as to trigger verification on the target user on the basis of identity information of the target user, and control logon of a target user client to the message page on the basis of a verification result.

The service request module 33 is configured to: in response to a service request instruction of the target user, initiate a service request with respect to the message on the basis of the logged on page, so as to trigger determining, based on a message right control policy, whether the target user has a right corresponding to a service requested by the service request, and control a response to the service request according to a determining result.

In an embodiment, the logon module 32 is further configured to: when the verification result represents that the target user is a legal user of the social platform, log onto the message page on the basis of an allocated user identifier, the user identifier being allocated on the basis of a social platform identifier of the target user in a one-to-one corresponding manner; and when the verification result represents that the target user is an illegal user of the social platform, present a prompt that the target user does not have a right to log onto the message page.

In an embodiment, the service request module 33 is further configured to: when the target user has the right corresponding to the service requested by the service request with respect to the message, present returned data of the service requested by the service request with respect to the message; and when the target user does not have the right corresponding to the service requested by the service request with respect to the message, present an illegal service request prompt to the target user.

An embodiment further provides a computer readable medium, which may be a ROM (such as a read-only memory, a flash memory, or a transfer apparatus), a magnetic storage medium (such as a magnetic tape, or a magnetic disk drive), an optical storage medium (such as a CD-ROM, a DVD-ROM, a paper card, or a paper tape), or other well-known types of program memories. The computer storage medium may store a computer executable instruction. When the instruction is executed, at least one processor is caused to perform the message right management methods according to the embodiments, for example, the message right management method shown in FIG. 2 and FIG. 5.

The embodiments have the following technical effects:

1) A message created by a source user reaches a target user by means of a message notification, and a method of performing verification during logon to the message page is provided, so that it is difficult for a non-target user to log onto the message page to view specific content of the message, preventing the non-target user from viewing the specific content of the message by means of the message notification when the message notification is forwarded to the non-target user, and ensuring information security.

2) A right of each target user with respect to a requested service is verified based on a message right management policy. A response is controlled according to a determining result, realizing a technical effect of targeted control over the service request of the target user. For a message created by the source user, the source user can still control an access right with respect to the message after sending the message, thereby effectively ensuring information security.

3) The right possessed by the target user with respect to the message is controlled by using a message status, so that the message sent by the source user can be withdrawn at any time, eliminating the restriction that the message can only be withdrawn within a specific period of time. When the message is sent out, whether the message is visible can also be set and switched.

The foregoing descriptions are merely specific embodiments, but are not intended to limit the protection scope. Any variation or replacement readily figured out by a person skilled in the art within the technical scope disclosed shall fall within the protection scope. Therefore, the protection scope shall be subject to the appended claims.

What is claimed is:

1. A message authority management method, including:
   obtaining a message for a target user to read, the message created by a source user;
   sending a message notification to the target user in a social platform;
   in response to sending the message notification, receiving a request to log into a message page;
   in response to receiving the request, verifying the target user;
   controlling log in of the target user to the message page based on a verification result of the verifying, wherein controlling the log in of the target user to the message page based on the verification result comprises:
      when the verification result represents that the target user is a legal user, allocating a user identifier for logging into the message page to a client device of the target user based on a social platform identifier of the target user, and logging into the message page by using the allocated user identifier; and
      when the verification result represents that the target user is an illegal user of the social platform, forbidding the target user to log into the message page, and sending, to the target user, a prompt that the target user does not have an authority to log into the message page;
   receiving a service request of the target user with respect to the message in response to the target user logging into the message page based on the verification result;
   when receiving the service request of the target user with respect to the message, determining, based on a message authority control policy, whether the target user has an authority corresponding to a service requested by the service request; and
   controlling a response to the service request according to a determining result.

2. The method according to claim 1, further comprising:
   obtaining at least one of the following type of message authorities set by the source user: an authority to view the message or an authority to forward the message;
   obtaining the type of message authorities set by the source user and a user identifier corresponding to the type of message authorities; and
   wherein the type of message authorities comprises at least one of the following: a user identifier having an access authority with respect to the message, a user identifier having no access authority with respect to the message, or only the source user has the message authority with respect to the message.

3. The method according to claim 1, wherein verifying the target user comprises:
   obtaining at least one of the following identity information of a client of the target user: a social platform identifier of the target user or a device identifier of the target user; and
   verifying whether the target user is a legal user in at least one of the following manners:
   determining, based on the social platform identifier of the target user, whether the target user is a legal user who has already registered with the social platform; or
   determining, based on the device identifier, whether the client of the target user is an identifier of a legal terminal used by the target user to log into the social platform.

4. The method according to claim 1, wherein determining, based on the message authority control policy, whether the target user has the authority corresponding to the service requested by the service request comprises:
   obtaining, from the message authority control policy, a type of a message authority set by the source user with respect to the message, and a user identifier corresponding to a control authority of a corresponding type; and
   determining, according to the type of the message and the user identifier, whether a user identifier of the target user matches a type of the service requested by the service request.

5. The method according to claim 1, wherein determining, based on the message authority control policy, whether the target user has the authority corresponding to the service requested by the service request comprises:
   obtaining, from the message authority control policy, a message status set by the source user with respect to the message, the message status comprising a visible state and an invisible state;
   when the message is in a visible state, determining that the target user has the authority corresponding to the service requested by the service request; and
   when the message is in an invisible state, determining that the target user does not have the authority corresponding to the service requested by the service request.

6. The method according to claim 1, wherein determining, based on the message authority control policy, whether the target user has the authority corresponding to the service requested by the service request comprises:
   obtaining, from the message authority control policy, a message status set by the source user with respect to the message, the message status comprising whether the message is in a withdraw state;
   when the message is not set to be in a withdraw state, determining that the target user has the authority corresponding to the service requested by the service request; and
   when the message is set to be in a withdraw state, determining that the target user does not have the authority corresponding to the service requested by the service request.

7. The method according to claim 1, wherein controlling the response to the service request according to the determining result comprises:
   when the target user has the authority corresponding to the service requested by the service request, returning data of the service requested by the service request to the target user; and
   when the target user does not have the authority corresponding to the service requested by the service request, blocking the response to the service request, and sending an illegal service request prompt to the target user.

8. A server, comprising:
a processor; and
a memory in communication with the processor and configured to store processor-executable instructions that, when executed by the processor, cause the processor to:
obtain a message for a target user to read, the message created by a source user;
send a message notification to the target user in a social platform;
in response to sending the message notification, receive a request to log into a message page;
in response to receipt of the request, verify the target user;
control log in of the target user to the message page based on a verification result of the verification;
receive a service request of the target user with respect to the message in response to the target user logging into the message page based on the verification result;
when receiving the service request of the target user with respect to the message, determine, based on a message authority control policy, whether the target user has an authority corresponding to a service requested by the service request by:
  obtaining, from the message authority control policy, a message status set by the source user with respect to the message, the message status comprising a visible state and an invisible state;
  when the message is in a visible state, determining that the target user has the authority corresponding to the service requested by the service request; and
  when the message is in an invisible state, determining that the target user does not have the authority corresponding to the service requested by the service request; and
control a response to the service request according to a determining result.

9. The server according to claim 8, wherein the processor-executable instructions, when executed by the processor, further cause the processor to:
obtain at least one of the following type of message authorities set by the source user: an authority to view the message or an authority to forward the message;
obtain the type of message authorities set by the source user and a user identifier corresponding to the type of message authorities; and
wherein the type of message authorities comprises at least one of the following: a user identifier having an access authority with respect to the message, a user identifier having no access authority with respect to the message, or only the source user has the message authority with respect to the message.

10. The server according to claim 8, wherein the processor-executable instructions, when executed by the processor, causes the processor to verify the target user by:
obtaining at least one of the following identity information of a client of the target user: a social platform identifier of the target user; and a device identifier of the target user; and
verifying whether the target user is a legal user in at least one of the following manners:
determining, based on the social platform identifier of the target user, whether the target user is a legal user who has already registered with the social platform; or
determining, based on the device identifier, whether the client of the target user is an identifier of a legal terminal used by the target user to log into the social platform.

11. The server according to claim 8, wherein the processor-executable instructions, when executed by the processor, causes the processor to control logon of the target user to the message page based on the verification result by:
when the verification result represents that the target user is a legal user, allocating a user identifier for logging into the message page to a client device of the target user based on a social platform identifier of the target user, and log into the message page for the target user by using the allocated user identifier; and
when the verification result represents that the target user is an illegal user of the social platform, forbidding the target user to log into the message page, and send, to the target user, a prompt that the target user does not have an authority to log into the message page.

12. The server according to claim 8, wherein the processor-executable instructions, when executed by the processor, causes the processor to determine whether the target user has an authority corresponding to the service requested by the service request by:
obtaining, from the message authority control policy, a type of a message authority set by the source user with respect to the message, and a user identifier corresponding to a control authority of a corresponding type; and
determining, according to the type of the message and the user identifier, whether a user identifier of the target user matches a type of the service requested by the service request.

13. The server according to claim 8, wherein the processor-executable instructions, when executed by the processor, causes the processor to determine whether the target user has an authority corresponding to the service requested by the service request by:
obtaining, from the message authority control policy, a message status set by the source user with respect to the message, the message status comprising whether the message is in a withdraw state;
when the message is not set to be in a withdraw state, determining that the target user has the authority corresponding to the service requested by the service request; and
when the message is set to be in a withdraw state, determining that the target user does not have the authority corresponding to the service requested by the service request.

14. The server according to claim 8, wherein the processor-executable instructions, when executed by the processor, causes the processor to control the response to the service request according to the determining result by:
when the target user has the authority corresponding to the service requested by the service request, returning data of the service requested by the service request to the target user; and
when the target user does not have the authority corresponding to the service requested by the service request, blocking the response to the service request, and send an illegal service request prompt to the target user.

15. A product comprising:
a non-transitory storage medium; and processor-executable instructions stored on the storage medium, the processor executable instructions configured to, when executed by a processor, cause the processor to:

obtain a message for a target user to read, the message created by a source user;

send a message notification to the target user in a social platform;

in response to sending the message notification, receive a request to log into a message page;

in response to receipt of the request, verify the target user;

control log in of the target user to the message page based on a verification result of the verification;

receive a service request of the target user with respect to the message in response to the target user logging into the message page based on the verification result;

when receiving a service request of the target user with respect to the message, determine, based on a message authority control policy, whether the target user has an authority corresponding to a service requested by the service request by:

obtaining, from the message authority control policy, a message status set by the source user with respect to the message, the message status comprising whether the message is in a withdraw state;

when the message is not set to be in a withdraw state, determining that the target user has the authority corresponding to the service requested by the service request; and when the message is set to be in a withdraw state, determining that the target user does not have the authority corresponding to the service requested by the service request; and control a response to the service request according to a determining result.

16. The product according to claim 15, wherein the processor-executable instructions, when executed by the processor, further cause the processor to:

obtain at least one of the following type of message authorities set by the source user: an authority to view the message or an authority to forward the message;

obtain the type of message authorities set by the source user and a user identifier corresponding to the type of message authorities; and wherein the type of message authorities comprises at least one of the following: a user identifier having an access authority with respect to the message, a user identifier having no access authority with respect to the message, or only the source user has the message authority with respect to the message.

17. The product according to claim 15, wherein the processor-executable instructions, when executed by the processor, causes the processor to verify the target user by:

obtaining at least one of the following identity information of a client of the target user: a social platform identifier of the target user; and a device identifier of the target user; and verifying whether the target user is a legal user in at least one of the following manners:

determining, based on the social platform identifier of the target user, whether the target user is a legal user who has already registered with the social platform; or determining, based on the device identifier, whether the client of the target user is an identifier of a legal terminal used by the target user to log into the social platform.

18. The product according to claim 15, wherein the processor-executable instructions, when executed by the processor, causes the processor to control logon of the target user to the message page based on the verification result by:

when the verification result represents that the target user is a legal user, allocating a user identifier for logging into the message page to a client device of the target user based on a social platform identifier of the target user, and log into the message page for the target user by using the allocated user identifier; and when the verification result represents that the target user is an illegal user of the social platform, forbidding the target user to log into the message page, and send, to the target user, a prompt that the target user does not have an authority to log into the message page.

* * * * *